United States Patent
Cai

(10) Patent No.: US 8,340,530 B2
(45) Date of Patent: Dec. 25, 2012

(54) LOCAL OSCILLATOR FREQUENCY OFFSET COMPENSATION IN A COHERENT OPTICAL SIGNAL RECEIVER

(75) Inventor: Yi Cai, Eatontown, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 163 days.

(21) Appl. No.: 12/718,177

(22) Filed: Mar. 5, 2010

(65) Prior Publication Data

US 2010/0232805 A1    Sep. 16, 2010

Related U.S. Application Data

(60) Provisional application No. 61/159,011, filed on Mar. 10, 2009, provisional application No. 61/159,018, filed on Mar. 10, 2009.

(51) Int. Cl.
*H04B 10/00* (2006.01)
*H04B 10/06* (2006.01)
*H04J 14/02* (2006.01)

(52) U.S. Cl. ........... 398/163; 398/93; 398/158; 398/208

(58) Field of Classification Search .................... 398/32, 398/33, 93, 154, 155, 158, 159, 163, 202, 398/208
See application file for complete search history.

(56) References Cited

U.S. PATENT DOCUMENTS

| | | | |
|---|---|---|---|
| 4,262,360 A | 4/1981 | Bigo et al. | |
| 5,049,830 A | 9/1991 | Yoshida | |
| 6,052,412 A | 4/2000 | Ruether et al. | |
| 6,560,303 B1 | 5/2003 | Fan et al. | |
| 7,031,405 B1 | 4/2006 | Touzni et al. | |
| 7,486,893 B1 | 2/2009 | Pepper et al. | |
| 2004/0197103 A1 | 10/2004 | Roberts et al. | |
| 2004/0208613 A1 | 10/2004 | Sinha et al. | |
| 2005/0111525 A1* | 5/2005 | Driesen et al. | 375/147 |
| 2005/0147415 A1 | 7/2005 | Fee et al. | |
| 2005/0169412 A1 | 8/2005 | Yang et al. | |
| 2005/0244164 A1 | 11/2005 | Miyashita et al. | |
| 2006/0132789 A1 | 6/2006 | Davidson et al. | |
| 2006/0291550 A1 | 12/2006 | Wang et al. | |
| 2007/0002982 A1 | 1/2007 | Heikkila | |
| 2007/0092260 A1 | 4/2007 | Bontu et al. | |
| 2007/0149135 A1 | 6/2007 | Larsson et al. | |
| 2007/0222654 A1 | 9/2007 | Vrazel et al. | |
| 2007/0300119 A1 | 12/2007 | Hidaka | |

(Continued)

OTHER PUBLICATIONS

Cai et al., Comparison of Two Carrier Phase Estimation Schemes in Optical Coherent Detection Systems, Optical Fiber Communication and the National Fiber Optic Engineers Conference, Mar. 25-29, 2007, 3 pages.

(Continued)

*Primary Examiner* — Dalzid Singh
(74) *Attorney, Agent, or Firm* — Grossman, Tucker, Perreault & Pfleger, PLLC

(57) ABSTRACT

A system and method implementing dual stage carrier frequency offset compensation (FOC) in a coherent receiver for an optical communication system. In the first stage, a feed forward FOC function compensates for relatively slowly drifting frequency offsets. In a second stage, a decision-feedback FOC function compensates for relatively quickly drifting frequency offsets. The feed forward frequency offset compensation may be implemented with a feed forward carrier phase estimation function and the decision-feedback frequency offset compensation may be implemented with a decision-feedback carrier phase estimation function.

20 Claims, 6 Drawing Sheets

U.S. PATENT DOCUMENTS

| | | | |
|---|---|---|---|
| 2008/0025733 | A1 | 1/2008 | Nazarathy et al. |
| 2008/0240224 | A1 | 10/2008 | Carballo et al. |
| 2008/0267638 | A1 | 10/2008 | Nakashima et al. |
| 2009/0033418 | A1 | 2/2009 | Ericson et al. |
| 2009/0047030 | A1 | 2/2009 | Hoshida |
| 2009/0245815 | A1* | 10/2009 | Zhang et al. ............. 398/208 |

OTHER PUBLICATIONS

International Search Report and Written Opinion dated May 12, 2010 issued in PCT Patent Application No. PCT/US10/26513, 10 pages.

Ly-Gagnon et al., Coherent Detection of Optical Quadrature Phase-Shift Keying Signals With Carrier Phase Estimation, Journal of Lightwave Technology, Jan. 2006, 10 pages, vol. 24, No. 1.

Noe, PLL-Free Synchronous QPSK Polarization Multiples/Diversity Receiver Concept With Digital I&Q Baseband Processing, IEEE Photonics Technology Letters, Apr. 2005, 3 pages, vol. 17, No. 4.

Cai, On Performance of Coherent Phase-Shift-Keying Modulation in 40 Gb/s Long-Haul Optical Fiber Transmission Systems, Optical Fiber Communication and the National Fiber Optic Engineers Conference, Mar. 2006, 3 pages, paper JThB11.

Ho, Electronic Compensation Technique to Mitigate Nonlinear Phase Noise, Journal of Lightwave Technology, Mar. 2004, pp. 779-783, vol. 22, No. 3.

International Search Report and Written Opinion dated Apr. 28, 2010 issued in PCT Patent Application No. PCT/US10/26508, 11 pages.

International Search Report and Written Opinion dated May 4, 2010 issued in PCT Patent Application No. PCT/US10/26511, 10 pages.

Ip et al., Compensation of Dispersion and Nonlinearity in WDM Transmission using Simplified Digital Backpropagation, IEEE, 2008, pp. 123-124.

Kikuchi, Electronic Post-compensation for Nonlinear Phase Fluctuation in a 1000-km 20-Gbit/s Optical Quadrature Phase-shift Keying Transmission System Using the Digital Coherent Receiver, Optics Express, Jan. 21, 2008, pp. 889-896, vol. 16, No. 2.

Li et al., Electronic post-compensation of WDM transmission impairments using coherent detection and digital signal processing, Optics Express, Jan. 21, 2008, pp. 880-888, vol. 16, No. 2.

Li, Recent advances in coherent optical communication, Advances in Optics and Photonics 1,279?307 [online], Feb. 11, 2009 [retrieved on Apr. 15, 2010],Retrieved from the Internet<URL:http://ofc.optics.ucf.edu/research/Recent%20advances%20in%20coherent%20optical%20communication.pdf.

Liu, Digital self-coherent detection, Optics Express vol. 16, No. 2 [online], Jan. 21, 2008 [retrieved on Apr. 15, 2010], Retrieved from the Internet<URL:http://www.opticsinfobase.org/view_article,cfm?gotourl=http%3A%2F%2Fwww%2Eopticsinfobase%2Eorg%2FDirectPDFAccess%2F03E36195%2DBDB9%2D137E%2DC6C65EC37B7F62E9%5F148802%2Epdf%3Fda%3D1%26id%3D148802%26seq%3DO&org=.

International Search Report and Written Opinion dated Apr. 27, 2010 issued in related International Patent Application No. PCT/US10/26504.

* cited by examiner

LOCAL OSCILLATOR FREQUENCY OFFSET COMPENSATION IN A COHERENT OPTICAL SIGNAL RECEIVER

CROSS-REFERENCE TO RELATED APPLICATIONS

The present application claims the benefit of U.S. Provisional Patent Application Ser. No. 61/159,011, filed on Mar. 10, 2009, and U.S. Provisional Patent Application Ser. No. 61/159,018, filed on Mar. 10, 2009, which are fully incorporated herein by reference.

TECHNICAL FIELD

The present application relates to the optical transmission of information and, more particularly, to local oscillator frequency offset compensation in a coherent optical signal receiver.

BACKGROUND

Signals may be used to transmit data over distances. In optical communication systems, for example, data may be modulated on one or more optical wavelengths to produce modulated optical signals that may be transmitted over optical waveguides such as optical fibers. One modulation scheme that may be used in optical communication systems is phase shift keying in which data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of phase shift keying and differential phase shift keying formats, such as return-to-zero DPSK (RZ-DPSK).

To receive the data, the signals may be detected and demodulated. In phase modulated optical communication systems, for example, coherent optical receivers may use coherent detection to detect modulated optical signals and may provide sensitivity advantages over receivers using non-coherent detection. Digital signal processing (DSP) may be implemented in such systems for processing the received signals to provide demodulated data. Digital signal processing of the received signals provides speed and flexibility and may be used to perform a variety of functions including estimation of the carrier phase of the received signals and data detection using the estimated carrier phase.

Coherent detection involves use of a local oscillator signal that is mixed with the received signal. Unfortunately, due to a variety of factors, the local oscillator output may change in the range of MHz to GHz in optical detection systems and may drift with time. To achieve highly accurate demodulation of the optical signal, it is desirable to compensate for any frequency offset between the received signal and the frequency of the local oscillator signal. Reliable frequency offset compensation methods should be capable of covering a wide range of frequency offsets and be adaptive to possible frequency drift.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements dual stage local oscillator (LO) frequency offset compensation (FOC). In the first stage, a feed forward FOC function compensates for relatively slowly drifting frequency offsets. In a second stage, a decision-feedback FOC function compensates for relatively quickly drifting frequency offsets. The feed forward frequency offset compensation may be implemented with a feed forward carrier phase estimation function and the decision-feedback frequency offset compensation may be implemented with a decision-feedback carrier phase estimation function.

Figure 1:
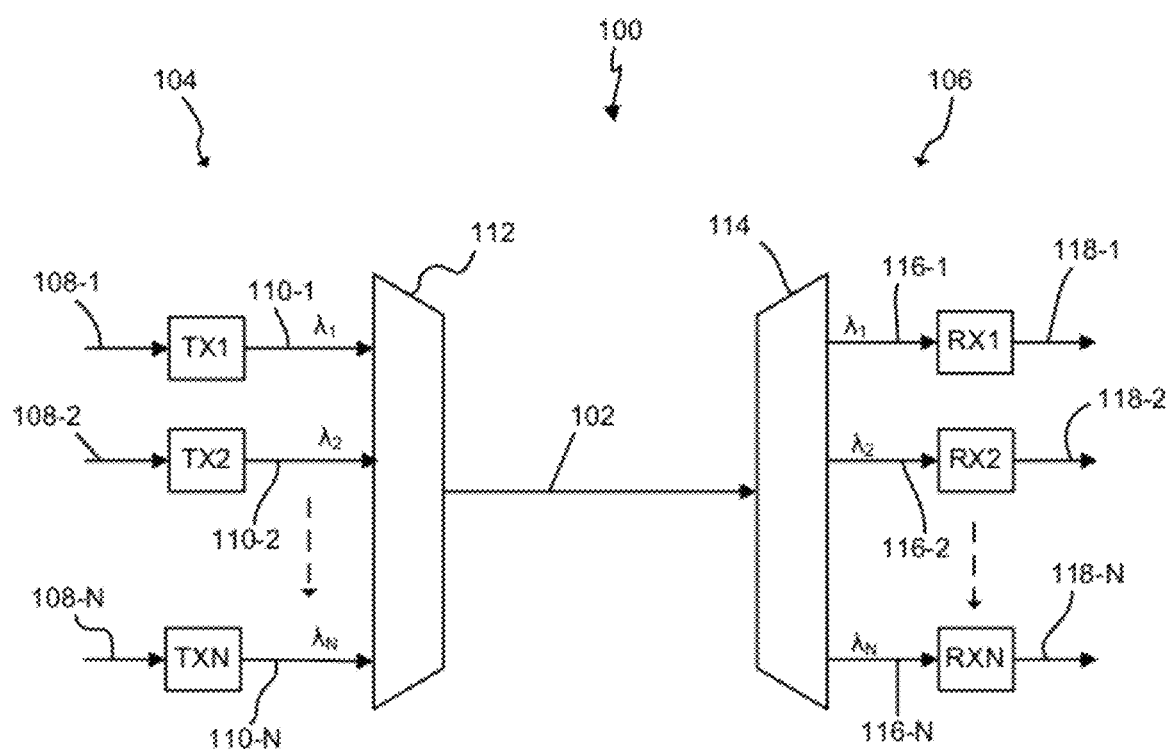
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a PSK modulation format, such as DBPSK, DQPSK, RZ-DPSK, RZ-DQPSK, etc. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 2:
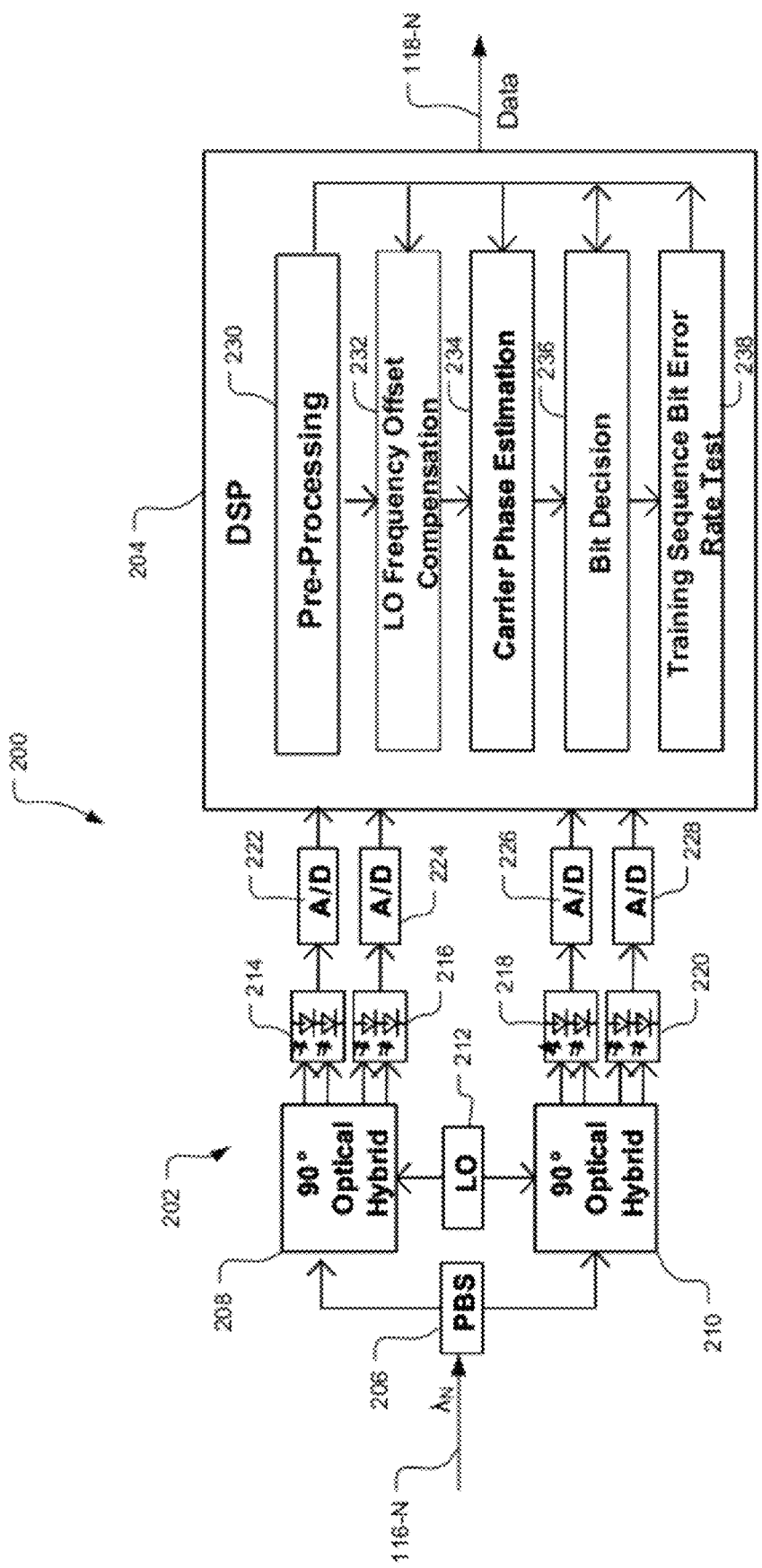
FIG. 2 is a block diagram of one exemplary embodiment of a receiver consistent with the present disclosure.

FIG. 2 is a simplified block diagram of one exemplary receiver 200 consistent with the present disclosure. The illustrated exemplary embodiment 200 includes a coherent receiver configuration 202 for receiving an input signal on path 116-N and a digital signal processing (DSP) circuit 204 for processing the output of the coherent receiver to provide an output data signal on path 118-N. Data is modulated on the carrier wavelength $\lambda_N$ of the optical input signal according to a PSK modulation format. The coherent receiver 202 converts the received optical input signal into one or more digital signals that are coupled as inputs to the DSP circuit 204. The DSP circuit demodulates the data from the digital signals to provide an output data stream on path 118-N representative of the data modulated on the carrier wavelength $\lambda_N$.

The coherent receiver 202 may take a variety of configurations. In the illustrated exemplary embodiment, the receiver includes a polarization beam splitter (PBS) 206, first and second 90° optical hybrids 208, 210, a local oscillator (LO) 212, balanced detectors 214, 216, 218, 220 and analog-to-digital (A/D) converters 222, 224, 226, 228. The operations of these components in a coherent optical signal receiver are briefly described as follows. In general, different polarizations of the input optical signal are split onto separate paths by the PBS 206. Each polarization is coupled to an associated 90° optical hybrid 208, 210. Each optical hybrid mixes its input signal with the four quadrilateral states of the LO oscillator signal in the complex-field space. Each optical hybrid then delivers the four mixed signals to two pairs of balanced detectors 214, 216, 218, 220. The outputs of the balanced detectors are converted to digital signals by the A/D converters 222, 224, 226, 228.

The digital outputs of the A/D converters are coupled as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a pre-processing function 230, a local oscillator (LO) frequency offset compensation function 232, a carrier phase estimation (CPE) function 234, a bit decision function 236 and an optional training sequence bit error rate test function 238. These functions may be implemented in a variety of configurations using any combination of hardware, software and/or firmware. Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

The pre-processing function 230 of the DSP may include various optical signal detection functions implemented in different types of DSP-based coherent detection receivers. The pre-processing functions may include, for example, a waveform recovery and alignment function, a deterministic distortion compensation function, a clock recovery function, a synchronized data re-sampling function, and a polarization tracking and polarization mode dispersion (PMD) compensation function.

In general, since the data in a PSK modulated signal is encoded in the phase of an optical carrier signal, demodulation of a PSK modulated signal in a DSP-based receiver involves estimating and tracking the carrier phase. The carrier phase estimation function 234 may be configured to estimate and track the phase of an optical carrier signal for performing demodulation and may be configured as a dual stage carrier phase estimation function. The carrier phase estimate from the carrier phase estimation function is coupled to a bit decision function 236 which determines the data or bit values represented by the carrier phase in the modulated signal and mitigates the effects of data pattern dependent signal distortion such as phase distortion. The output of the bit decision function may thus be representative of the data modulated on the carrier wavelength $\lambda_N$ and may be coupled on an output on path 118-N. The optional training sequence error rate test function 238 may be configured for performing a bit error rate (BER) test on training sequence for training the operation of the carrier phase estimation function.

Figure 3:
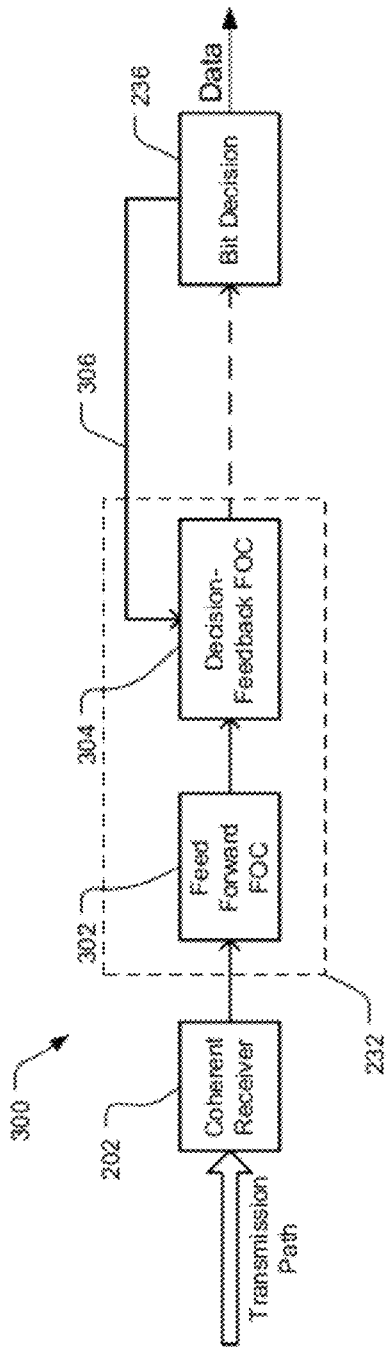
FIG. 3 is a block diagram of one exemplary embodiment of a receiver incorporating a dual stage frequency offset compensation function consistent with the present disclosure.

The LO frequency offset compensation function 232 may be configured to track and compensate for frequency offset between the received signal and the LO signal. FIG. 3 is a simplified block diagram of one exemplary embodiment of a receiver 300 incorporating a dual stage LO frequency offset compensation function 232 consistent with the present disclosure. The illustrated exemplary embodiment includes a coherent receiver 202 for receiving an optical signal having data modulated thereon. The dual stage LO frequency offset compensation function 232 includes a feed forward FOC function 302 that provides a slow-drift local oscillator frequency offset compensation and a decision feedback FOC function 304 that provides a fast-drift local oscillator frequency offset compensation. Fast-drift frequency offset compensation compensates for relatively quickly (e.g., in GHz) changing frequency offsets and slow-drift frequency offset compensation compensates for relatively slowly changing (e.g., in MHz) frequency offsets. Local oscillator frequency offsets may be indicated by accumulated phase changes when estimating carrier phase during demodulation of the received signal. One example of slow-drift local oscillator frequency offset is generally represented by the slope of the phase curve shown in FIG. 6 and one example of fast-drift local oscillator frequency offset is generally represented by the slope of phase change shown in FIG. 7.

In general, local oscillator frequency offset estimates may be determined from carrier phase estimates, for example, provided by the CPE function 234. The feed forward FOC function 302 may be implemented as part of any feed forward CPE function that may be used for estimating the carrier phase of an optical signal, e.g. in connection with the CPE function 234 shown in FIG. 2. The decision feed back FOC function 304 may be implemented as part of any decision feedback CPE function that may be used for estimating the carrier phase of an optical signal, e.g. in connection with the CPE function 234 shown in FIG. 2. Processing of the feed forward FOC function and a feed forward CPE function may be shared in the DSP circuit and/or processing of the decision feedback FOC function and a decision feedback CPE function may be shared in the DSP circuit.

Feed forward CPE functions capable of providing carrier phase estimates for use in the feed forward FOC function include, for example, a Costas loop function, an average phase function, and an Mth power scheme. Examples of coherent receiver configurations using Mth power schemes for feed forward CPE are described in Ly-Gagnon et al., "Coherent Detection of Optical Quadrature Phase-Shift Keying Signals With Carrier Phase Estimation," Journal of Lightwave Technology, Vol. 24, No. 1, pp. 12-21 (January 2006) and in R. Noé, "PLL-Free Synchronous QPSK Polarization Multiplex/Diversity Receiver Concept With Digital I&Q Baseband Processing," IEEE Photonics Technology Letters, Vol. 17, No. 4, pp. 887-889 (April 2005), which are fully incorporated herein by reference. A description and comparison of Mth power and decision feedback CPE schemes for use in a DSP-based coherent receiver are provided in Yi Cai and Alexei N. Pilipetskii, "Comparison of Two Carrier Phase Estimation Schemes in Optical Coherent Detection Systems," Optical Fiber Communication and the National Fiber Optic Engineers Conference, 2007, pages 1-3 (March 2007), the teachings of which are fully incorporated herein by reference.

Decision feedback CPE functions may be used to provide carrier phase estimates for use in the decision feedback FOC function. The output of the decision feedback FOC function 304 may be determined in response to feedback 306 from the bit decision function 236. In operation, the first stage feed forward FOC function provides an initial frequency offset compensation that compensates slow drifting local oscillator frequency offset and establishes a decision accuracy sufficient for allowing operation of the second stage decision feedback FOC function. The decision feedback FOC function compensates for fast changing local oscillator frequency offset.

Figure 4:
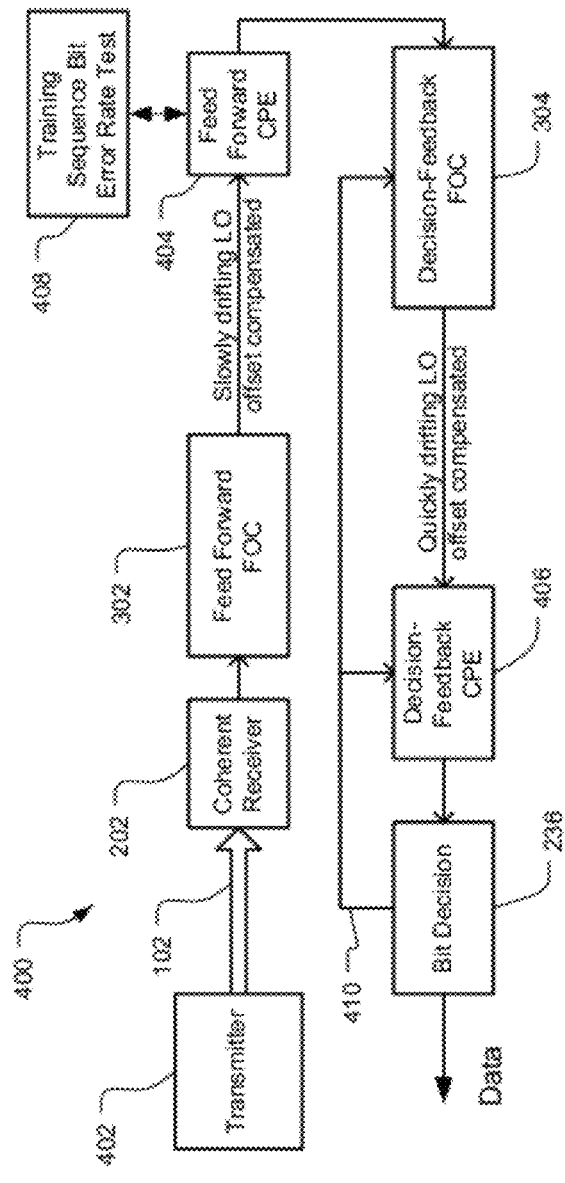
FIG. 4 is a block diagram of an exemplary optical communication system incorporating a dual stage frequency offset compensation function consistent with the present disclosure.

FIG. 4 is a simplified block diagram of an exemplary optical communication system 400 incorporating dual stage local oscillator frequency offset compensation functions 302, 304 combined with dual stage carrier phase estimation functions 404, 406 consistent with the present disclosure. For simplicity and ease of explanation, the system is shown including only a single coherent receiver 202 for receiving only a single wavelength. It is to be understood that the system may be configured as a WDM system including a demultiplexer and a plurality of receivers for receiving multiple wavelengths. Although the feed forward FOC function 302 and feed forward CPE function 404 are shown as separate functional blocks and the decision-feedback FOC function 304 and decision-feedback CPE function 406 are shown as separate functional blocks, the FOC functions may be performed together with the CPE functions as discussed below.

In the illustrated exemplary embodiment, a transmitter 402 may be configured for selectively transmitting user data in an operating mode, or a training sequence, e.g. a pseudo random bit sequence (PRBS), in a training mode. The output of the transmitter is coupled on an optical transmission path 102 and transmitted to the coherent receiver 202, which mixes a local oscillator signal with the received optical signal and provides one or more electrical signals representative thereof. The feed forward FOC function 302, the feed forward CPE 404, the decision-feedback FOC 304, and the decision-feedback CPE 406 may then provide frequency offset compensation and carrier phase estimation in response to the received electrical signal(s). The feed forward FOC function 302 may provide an estimate of slow-drift local oscillator frequency offset and may compensate for any estimated slow-drift frequency offset in the received electrical signal(s). The feed forward CPE function 404 may provide an initial CPE used by the feed forward FOC function 302 to determine the slow-drift local oscillator frequency offset estimate.

The decision feedback CPE function 406 may provide an operational CPE in response to the received signal and/or the initial CPE. The decision feedback FOC function 304 may provide an estimate of fast-drift local oscillator frequency offset and may compensate for any estimated fast-drift frequency offset when determining the operational CPE. The operational CPE output of the decision feedback CPE function 406 may be coupled to a bit decision function 236. The bit decision function may use the operational CPE to determine the data or bit values represented by the carrier phase in the modulated signal and provide an output representative of the data modulated on the carrier wavelength. The bit decision function may also provide feedback 410 to the decision feedback CPE function 406 and/or the decision feedback FOC function 304 for performing a decision feedback CPE together with a decision feedback frequency offset compensation.

In one embodiment, the feed forward CPE function 404 may be operated in a training mode. In the training mode, the transmitter 402 may transmit a training sequence. The CPE established by the feed forward CPE function 404 may be coupled to a training sequence bit error rate test function 408, which may apply the CPE to determine whether the training sequence can be synchronized using the CPE. In one embodiment, for example, any phase ambiguity from the feed forward CPE may be eliminated by rotating through possible phase rotation values associated with the signal and attempting to obtain a training sequence synchronization using the training sequence error rate tester 238. In this embodiment, the feed forward CPE function 404 may not provide an initial CPE until the training sequence bit error rate test function 408 can synchronize the training sequence using the CPE from the feed forward CPE function. Once the training mode is complete, the system may enter an operating mode whereby the transmitter 402 may transmit user data on the transmission path. In the operating mode, the initial CPE may not be provided to the decision-feedback CPE function 406. The training mode may, however, be run periodically to keep the carrier phase estimation on track.

The initial stage feed forward FOC function 302 provides an initial FOC that compensates slow drifting local oscillator frequency offset and establishes a decision accuracy sufficient for allowing operation of the decision feedback FOC function 304 and the decision feedback CPE function 406. The decision feedback FOC function 304 compensates for fast changing local oscillator frequency offset. In addition, the initial CPE established by the feed forward CPE establishes decision accuracy sufficient for allowing operation of the decision feedback CPE function when it is impractical to use a decision feedback CPE function alone due to insufficient decision accuracy.

Figure 5:
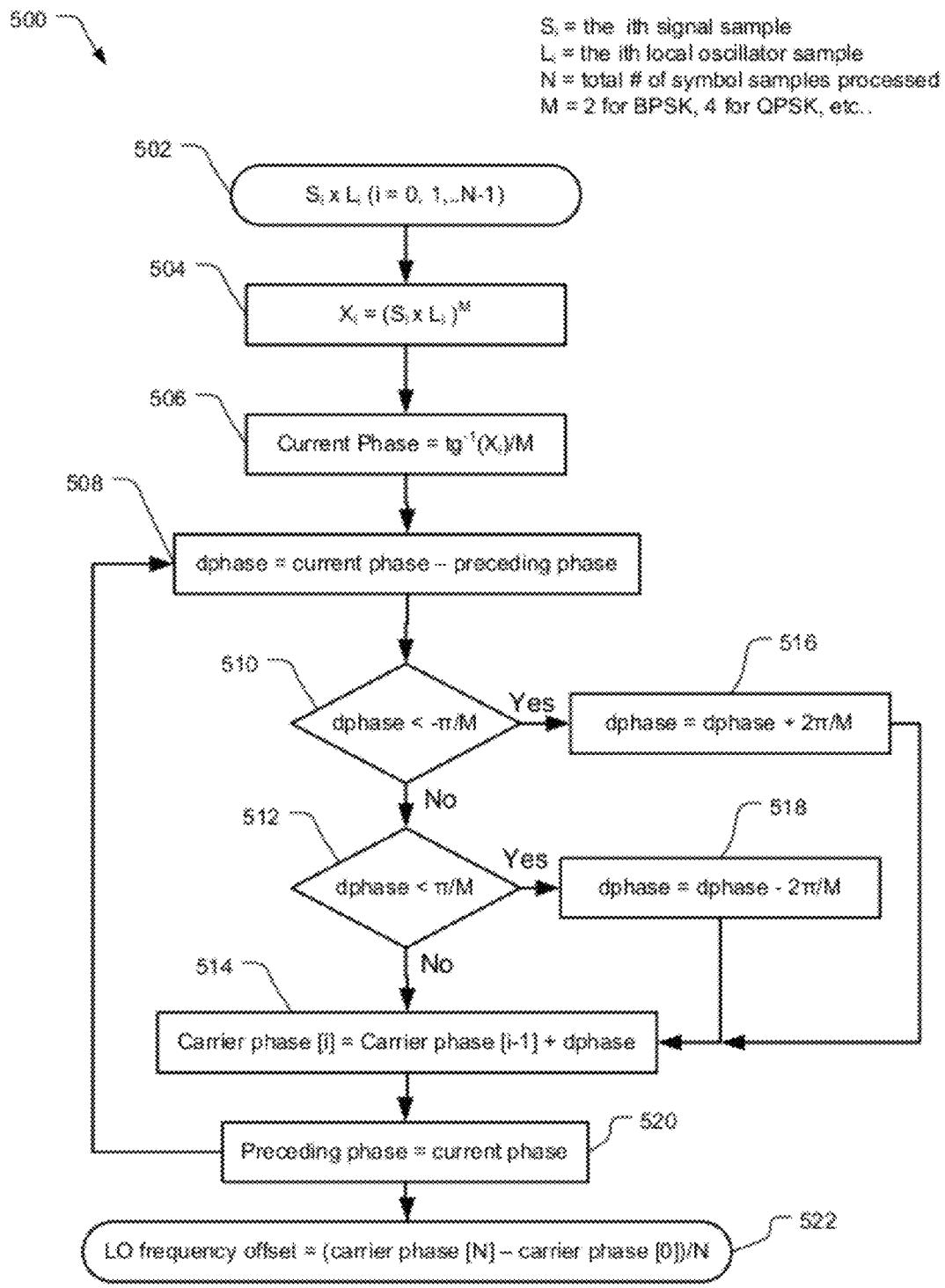
FIG. 5 is a flow chart illustrating a first stage of an exemplary dual stage frequency offset compensation process consistent with the present disclosure.
Figure 8:
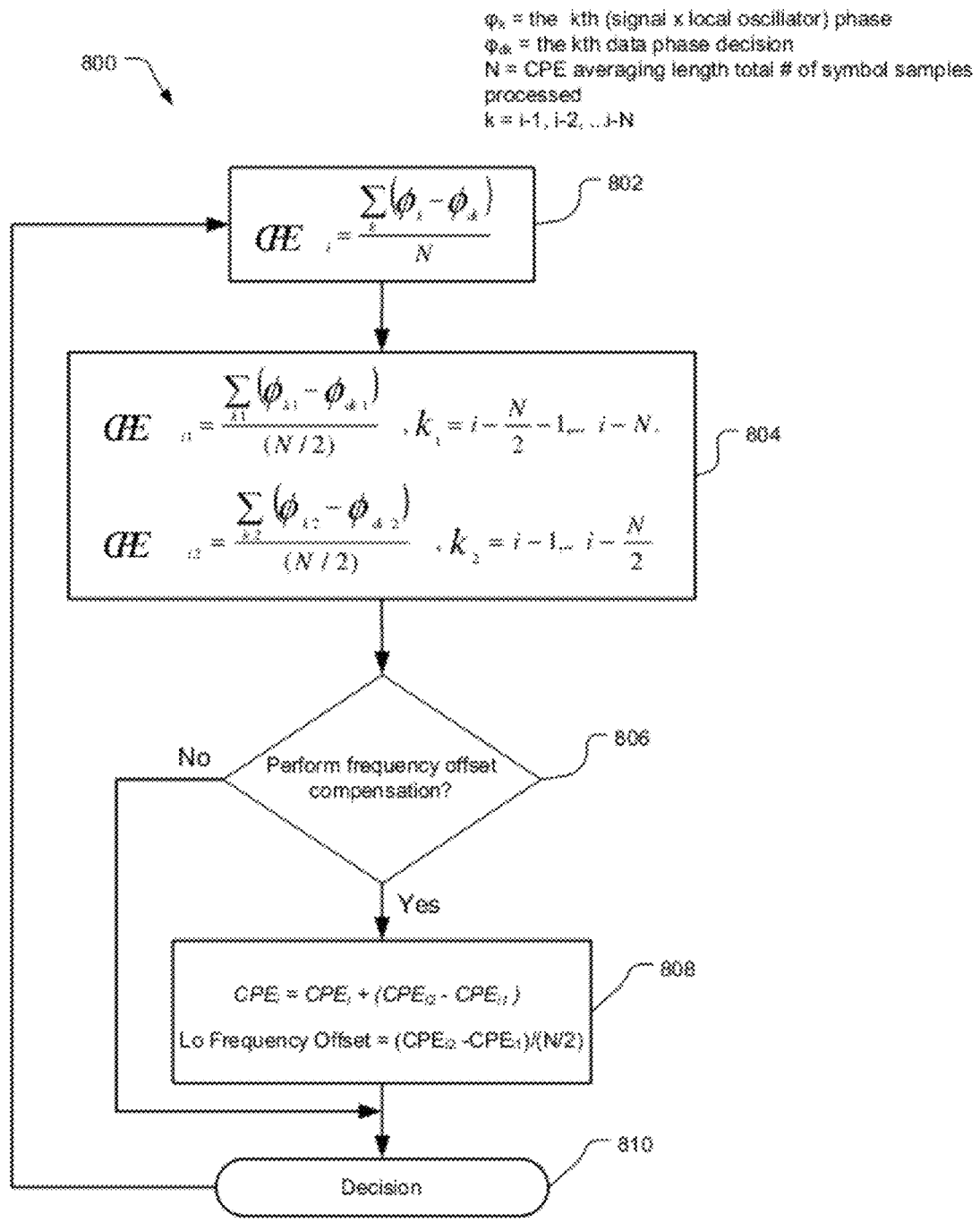
FIG. 8 is a flow chart illustrating a second stage of an exemplary dual stage frequency offset compensation process consistent with the present disclosure.

FIGS. 5 and 8 illustrate dual stage frequency offset compensation processes consistent with the present disclosure. The flow charts used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

FIG. 5 is a flow chart illustrating a first stage frequency offset estimation process 500 capable of providing slow-drift frequency offset compensation, consistent with the present disclosure. The first stage frequency offset estimation process 500 generally uses a feed forward CPE process to determine carrier phase estimates used to determine frequency offset estimates. In particular, the illustrated exemplary embodiment utilizes an Mth power scheme in the feed forward CPE process. An Mth power scheme estimates the phase of a current symbol of an M-ary (i.e. M=2 for BPSK, M=4 for QPSK, etc.) PSK formatted signal by averaging over N neighbor symbols the signal samples of which are raised to the Mth power. It is to be understood, however, that a system or method consistent with the present disclosure is not limited to use of any specific feed forward CPE process for the feed forward FOC process.

In the exemplary embodiment illustrated in FIG. 5, $S_i$ is the ith signal sample, $L_i$ is the ith local oscillator sample, and N is the total number of symbol samples processed. Initially, the current phase is calculated 502, 504, 506 from the received samples, for example, using an Mth power CPE calculation. The phase change (dphase) between consecutive symbols is calculated 508, for example, by subtracting a preceding phase of a preceding symbol from the current phase. To provide phase jump correction, the calculated phase change may be compared to $-\pi/M$ and $\pi/M$ 510, 512 and a corrected phase change may be determined 516, 518. The carrier phase estimate may then be determined 514, for example, based on a carrier phase of a preceding signal sample plus the appropriate phase change. The preceding phase may be set to the current phase 520 and the process may be repeated for any number of symbol samples processed. A local oscillator frequency offset estimate may then be determined 522, for example, by determining the slope of the phase change over the total number of symbol samples processed. Compensation for this estimated frequency offset may be accomplished by subtracting the phase change caused by the frequency offset from the $S_i \times L_i$ samples.

Figure 6:
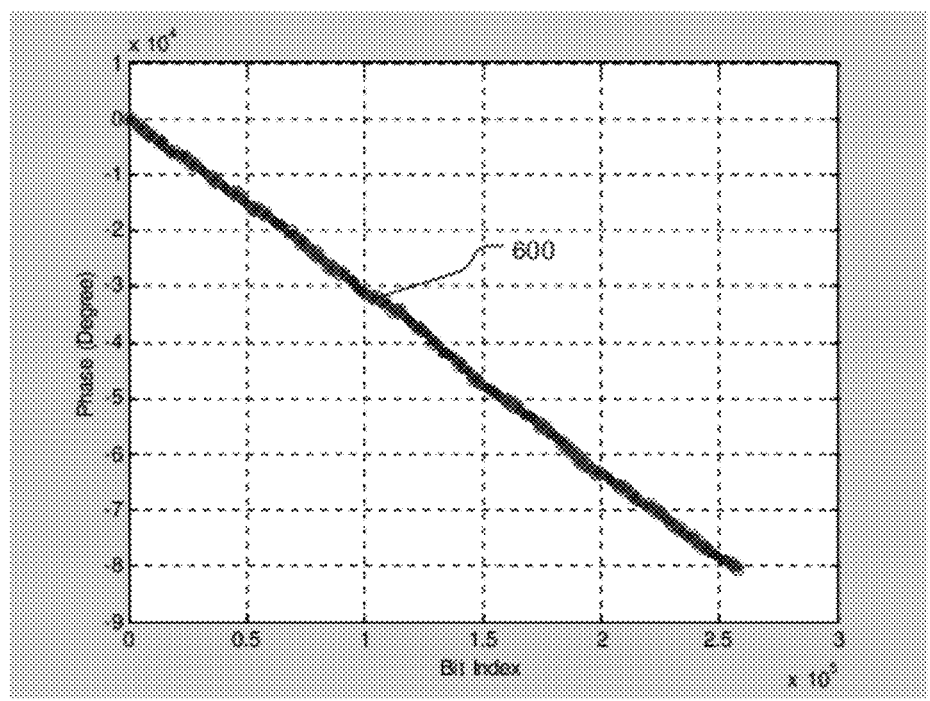
FIG. 6 includes a plot of accumulated phase change between consecutive symbols vs. sample number (bit index) in a first stage of a dual stage frequency offset compensation process consistent with the present disclosure.

The resulting phase estimate over a period of time may be characterized as shown in FIG. 6, which is a plot 600 of accumulated phase change between consecutive symbols vs. sample number (bit index). The constant slope of the accumulated phase, as shown in FIG. 6, indicates a constant local oscillator frequency offset from the received signal.

Figure 7:
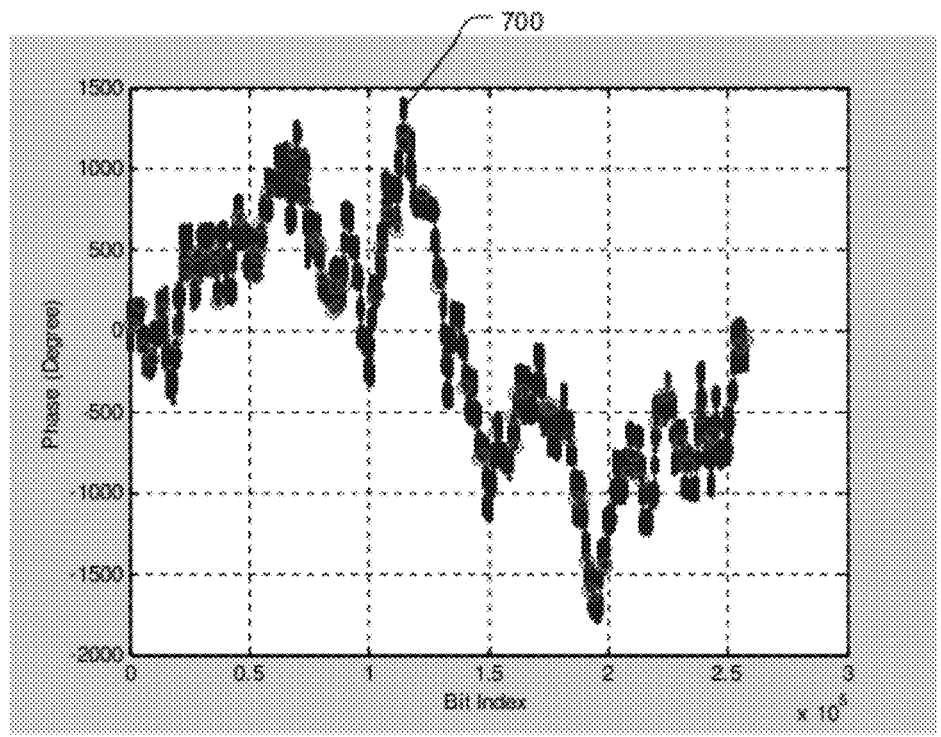
FIG. 7 includes a plot of accumulated phase change between consecutive symbols vs. sample number (bit index) at an output of a first stage of a dual stage frequency offset compensation process consistent with the present disclosure.

FIG. 7 is a plot 700 of accumulated phase change between consecutive symbols vs. sample number (bit index) after the first stage frequency offset compensation. The plot in FIG. 7 exhibits a smaller accumulated phase change than that shown but exhibits some relatively fast changing frequency offset. The fast changing frequency offset may be compensated by a second stage FOC process implemented by a decision feedback FOC function consistent with the present disclosure.

FIG. 8 is a flow chart of a second stage frequency offset compensation process 800 capable of providing fast-drift frequency offset compensation, consistent with the present disclosure. The second stage frequency offset compensation process 800 generally uses a decision feedback CPE process to determine carrier phase estimates used to determine frequency offset estimates. In particular, the frequency offset estimate, i.e. the slope of phase change, may be determined by dividing the averaging window of a decision feedback CPE into two equal length parts and determining the slope of the phase change over the averaging window.

In the exemplary embodiment of FIG. 8, $\phi_k$ is the kth (signal×local oscillator) phase, $\phi_{dk}$ is the kth data phase decision, and N is the CPE averaging length. Initially, a decision feedback CPE may be determined 802 based on an average phase in an averaging window and the average phases of the first and second half of the CPE averaging window may be calculated 804. If frequency offset compensation is to be performed 806, the frequency offset in the averaging window may be determined and compensated 808 from the slope of the phase change between the two average phase calculations. From the carrier phase estimates, a decision is made 810 to determine the data or bit values represented by the carrier phase in the modulated signal and the decision feedback is used in future carrier phase estimations.

According to one aspect of the disclosure, a system is provided for compensating for frequency offset between a local oscillator signal and a data signal in a coherent receiver. The system includes a digital signal processor (DSP) configured to perform a feed forward frequency offset compensation function to provide a slow-drift frequency offset estimate and compensate for slow-drift frequency offset based on the slow-drift frequency offset estimate and configured to perform a decision feedback frequency offset compensation function to provide a fast-drift frequency offset estimate in response to feedback from a bit decision function and to compensate for fast-drift frequency offset based on the fast-drift frequency offset estimate.

According to another aspect of the present disclosure, an optical communication system is provided. The optical communication system includes a transmitting terminal for transmitting a plurality of optical signals, each at a different associated wavelength, on an optical information path, at least one of the optical signals being a phase shift keying (PSK) signal having data modulated thereon according to a phase shift keying modulation format. The optical communication system also includes a receiving terminal coupled to the optical information path for receiving at least one of the plurality of optical signals. The receiving terminal includes an optical signal receiver for receiving the PSK signal, mixing the PSK signal with a local oscillator signal, and providing at least one electrical signal representative of the PSK signal. The receiving terminal further includes a digital signal processor (DSP) configured to receive the electrical signal, to perform a feed forward frequency offset compensation function to provide an estimate of slow-drift frequency offset between the received signal and the local oscillator signal and to compensate for the slow-drift frequency offset based on the slow-drift frequency offset estimate, and the DSP being configured to perform a decision feedback frequency offset compensation function to provide an estimate of fast-drift frequency offset between the received signal and the local oscillator signal in response to feedback from a bit decision function and to compensate for the fast-drift frequency offset based on the fast-drift frequency offset estimate.

According to a further aspect of the present disclosure, a method is provided for demodulating a received optical signal having data modulated thereon according to a phase shift keying modulation format. The method includes: mixing the optical signal with a local oscillator signal; converting the optical signal into at least one electrical signal representative of the optical signal; performing a feed forward frequency offset compensation function to provide an estimate of slow-drift frequency offset between the received signal and the local oscillator signal and to compensate for the slow-drift frequency offset in the electrical signal based on the slow-drift frequency offset estimate; performing a decision feedback carrier phase estimation function in response to the electrical signal and in response to feedback from a bit decision function to provide an operational carrier phase estimation associated with the optical signal; performing a decision feedback frequency offset compensation function to provide an estimate of fast-drift frequency offset between the received signal and the local oscillator signal in response to feedback from a bit decision function and to compensate for the fast-drift frequency offset in the operational carrier phase estimation based on the fast-drift frequency offset estimate; and performing a bit decision function to determine data values from the electrical signal in response to the operational carrier phase estimation to provide an output representative of the data modulated on the optical signal.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A coherent receiver, comprising:
a local oscillator configured to generate a local oscillator signal for mixing with a received signal;
a digital signal processor (DSP) configured to perform a feed forward frequency offset compensation function to provide a slow-drift frequency offset estimate between the received signal and the local oscillator signal and compensate for slow-drift frequency offset based on the slow-drift frequency offset estimate and configured to perform a decision feedback frequency offset compensation function to provide a fast-drift frequency offset estimate between the received signal and the local oscillator signal in response to feedback from a bit decision function and to compensate for fast-drift frequency offset based on the fast-drift frequency offset estimate.

2. The system of claim 1 wherein said DSP is configured to provide the slow-drift frequency offset estimate based on a carrier phase estimate determined using a feed forward carrier phase estimation function.

3. The system of claim 2 wherein the feed forward carrier phase estimation function uses an Mth power scheme.

4. The system of claim 2 wherein the slow-drift frequency offset estimate is determined by calculating a slope of phase change of carrier phase estimates over a number of signal samples.

5. The system of claim 2 wherein the feed forward frequency offset compensation function is configured to compensate for the slow-drift frequency offset in samples of the received signal.

6. The system of claim 1 wherein the DSP is configured to provide the fast-drift frequency offset compensation estimate based on a carrier phase estimate determined using a decision-feedback carrier phase estimation function.

7. The system of claim 6 wherein the fast-drift frequency offset estimate is determined by calculating a slope of phase change of between first and second carrier phase estimates determined from first and second halves of a carrier phase estimate averaging window used by the decision-feedback carrier phase estimation function.

8. The system of claim 6 wherein the decision feedback frequency offset compensation function is configured to compensate for the fast-drift frequency offset in the carrier phase estimates determined using the decision feedback carrier phase estimation function.

9. The system of claim 1 further comprising a coherent receiver configured to receive an optical signal, to mix a local oscillator signal with the optical signal, and to provide at least one digital signal representative of the received optical signal, wherein the DSP is configured to receive the digital signal and to compensate for the frequency offset between the local oscillator signal and the received optical signal.

10. A optical communication system comprising:
a transmitting terminal for transmitting a plurality of optical signals, each at a different associated wavelength, on an optical information path, at least one of the optical signals being a phase shift keying (PSK) signal having data modulated thereon according to a phase shift keying modulation format;
a receiving terminal coupled to the optical information path for receiving at least one of the plurality of optical signals, the receiving terminal comprising:
an optical signal receiver for receiving the PSK signal, mixing the PSK signal with a local oscillator signal, and providing at least one electrical signal representative of the PSK signal; and
a digital signal processor (DSP) configured to receive the electrical signal, to perform a feed forward frequency offset compensation function to provide a slow-drift frequency offset estimate between the received signal and the local oscillator signal and to compensate for the slow-drift frequency offset based on the slow-drift frequency offset estimate, and the DSP being configured to perform a decision feedback frequency offset compensation function to provide a fast-drift frequency offset estimate between the received signal and the local oscillator signal in response to feedback from a bit decision function and to compensate for the fast-drift frequency offset based on the fast-drift frequency offset estimate.

11. The optical communication system of claim 10, wherein the DSP is further configured to perform a feed forward carrier phase estimation function to provide an initial carrier phase estimation and to perform a decision feedback carrier phase estimation function to provide an operational carrier phase estimation in response to feed back from a bit decision function, the bit decision function being configured to determine data values represented by the electrical signal in response to the operational carrier phase estimation to provide an output representative of the data modulated on the PSK signal, wherein the DSP is configured to determine the slow-drift frequency offset estimate from the initial carrier phase estimations provided by the feed forward carrier phase estimation function, and wherein the DSP is configured to determine the fast-drift frequency offset estimate from the operational carrier phase estimations provided by the decision-feedback carrier phase estimation function.

12. The optical communication system of claim 11, wherein the feed forward carrier phase estimation function uses an Mth power scheme.

13. The optical communication system of claim 11, wherein the slow-drift frequency offset estimate is determined by calculating a slope of phase change of carrier phase estimations determined by the feed forward carrier phase estimation function over a number of signal samples.

14. The optical communication system of claim 13, wherein the fast-drift frequency offset estimate is determined by calculating a slope of phase change between first and second carrier phase estimations determined by the decision feedback carrier phase estimation function for first and second halves of a carrier phase estimation averaging window used by the decision-feedback carrier phase estimation function.

15. The optical communication system of claim 11, wherein the decision feedback carrier phase estimation function is configured to enter an operational mode after the initial carrier phase estimation is provided to determine operational carrier phase estimations in response to the received signal.

16. The optical communication system of claim 11, wherein the feed forward frequency offset compensation function is configured to compensate for the slow-drift frequency offset in samples of the received signal, and wherein the decision feedback frequency offset compensation function is configured to compensate for the fast-drift frequency offset in the operational carrier phase estimates provided by the decision feedback carrier phase estimation function.

17. A detection method for demodulating a received optical signal having data modulated thereon according to a phase shift keying modulation format, the method comprising:
   mixing the optical signal with a local oscillator signal;
   converting the optical signal into at least one electrical signal representative of the optical signal;
   performing a feed forward frequency offset compensation function to provide a slow-drift frequency offset estimate between the received signal and the local oscillator signal and to compensate for the slow-drift frequency offset in the electrical signal based on the slow-drift frequency offset estimate;
   performing a decision feedback carrier phase estimation function in response to the electrical signal and in response to feedback from a bit decision function to provide an operational carrier phase estimation associated with the optical signal;
   performing a decision feedback frequency offset compensation function to provide a fast-drift frequency offset estimate between the received signal and the local oscillator signal in response to feedback from a bit decision function and to compensate for the fast-drift frequency offset in the operational carrier phase estimation based on the fast-drift frequency offset estimate; and
   performing a bit decision function to determine data values from the electrical signal in response to the operational carrier phase estimation to provide an output representative of the data modulated on the optical signal.

18. The method of claim 17 further comprising:
   performing a feed forward carrier phase estimation function to provide an initial carrier phase estimation associated with the optical signal, wherein the slow-drift frequency offset estimate is determined from initial carrier phase estimations provided by the feed forward carrier phase estimation function.

19. The method of claim 18 wherein the decision feedback carrier phase estimation function provides at least some of operational carrier phase estimations in response to an initial carrier phase estimation provided by the feed forward carrier phase estimation function.

20. The method of claim 18 wherein the feed forward carrier phase estimation function uses an Mth power scheme.

* * * * *